United States Patent
Suryanarayana et al.

(10) Patent No.: US 12,073,228 B2
(45) Date of Patent: Aug. 27, 2024

(54) INFORMATION HANDLING SYSTEM SUPPORTING DISTRIBUTED FILE SYSTEM AND COMPOUND NAMESPACE IN PRE-BOOT ENVIRONMENT

(71) Applicant: Dell Products L.P., Round Rock, TX (US)

(72) Inventors: Shekar Babu Suryanarayana, Bangalore (IN); Srikanth Krishnamurthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 412 days.

(21) Appl. No.: 17/382,112

(22) Filed: Jul. 21, 2021

(65) Prior Publication Data

US 2023/0029401 A1    Jan. 26, 2023

(51) Int. Cl.
  *G06F 9/4401*    (2018.01)
  *G06F 16/182*    (2019.01)
  *G06F 16/188*    (2019.01)

(52) U.S. Cl.
  CPC .......... *G06F 9/4416* (2013.01); *G06F 16/182* (2019.01); *G06F 16/188* (2019.01)

(58) Field of Classification Search
  CPC ..... G06F 9/4416; G06F 16/182; G06F 16/188
  See application file for complete search history.

(56) References Cited

U.S. PATENT DOCUMENTS

| | | | | |
|---|---|---|---|---|
| 6,687,701 | B2* | 2/2004 | Karamanolis | G06F 16/10 |
| 7,240,114 | B2* | 7/2007 | Karamanolis | G06F 16/10 |
| | | | | 370/254 |
| 8,046,333 | B1* | 10/2011 | Wang | G06F 16/13 |
| | | | | 707/646 |
| 2002/0165990 | A1* | 11/2002 | Singhal | H04W 84/10 |
| | | | | 709/249 |
| 2010/0088423 | A1* | 4/2010 | Mazzagatte | H04L 63/08 |
| | | | | 709/229 |
| 2013/0132575 | A1* | 5/2013 | Hung | H04L 9/40 |
| | | | | 709/225 |
| 2013/0339407 | A1* | 12/2013 | Sharpe | G06F 16/137 |
| | | | | 707/827 |
| 2016/0306961 | A1* | 10/2016 | Suryanarayana | G06F 9/4403 |
| 2017/0264649 | A1* | 9/2017 | Sonar | G06F 13/387 |

(Continued)

*Primary Examiner* — Aurel Prifti
(74) *Attorney, Agent, or Firm* — Jackson Walker L.L.P.

(57) ABSTRACT

A UEFI client initiates an SMB negotiation with a remote server for an augmented capability protocol that supports secure distributed namespace compounding via customized commands and trusted share-specific and transaction-specific data structures, referred to herein simply as secure blobs, communicated over a secure tunnel. The client platform may include a nonvolatile storage resource containing factory-installed AC modules for both the client and the server, as well as factory stored profile information for known remote shares. Upon successfully negotiating for the AC protocol, the UEFI client may retrieve and install the AC client and server modules to enable the AC protocol. The AC client may mount a local namespace, which includes a namespace folder for each remote share. The AC server module, in combination with remote share profile information provided by the AC client, enables the remote server to mount a virtual distributed namespace and function as a RVDN server.

14 Claims, 6 Drawing Sheets

(56) References Cited

U.S. PATENT DOCUMENTS

| | | | |
|---|---|---|---|
| 2018/0219964 A1* | 8/2018 | Carpenter | H03M 7/12 |
| 2018/0351936 A1* | 12/2018 | Battacharya | H04L 67/141 |
| 2019/0281113 A1* | 9/2019 | Preston | H04L 45/54 |
| 2019/0370214 A1* | 12/2019 | Vidyadhara | G06F 13/1642 |
| 2020/0012637 A1* | 1/2020 | Strauss | G06F 16/182 |
| 2020/0326956 A1* | 10/2020 | Raayman | G06F 9/4408 |
| 2021/0279151 A1* | 9/2021 | Sarkar | G06F 11/1469 |

* cited by examiner

INFORMATION HANDLING SYSTEM SUPPORTING DISTRIBUTED FILE SYSTEM AND COMPOUND NAMESPACE IN PRE-BOOT ENVIRONMENT

TECHNICAL FIELD

The present disclosure relates to the configuration and management of information handling systems and, more specifically, information handlings system in a pre-boot environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems, including without limitation many laptop, notebook, and desktop computer systems, are configured to respond to a system reset or power on signal by booting into a predetermined end-user state in which the system's various components and other resources have been identified and configured and an operating system has been loaded. In this disclosure, the term "pre-boot" refers to the interval following a system reset but before the operating system is loaded.

Information handling systems generally lack pre-boot capabilities for dynamically locating a boot-able image version on a network store and cannot. Existing network-based boot solutions, such as iPXE, use a static profile to connect to pre-profiled boot images from a network boot manager in BIOS. While network files systems including CIFS support features enabling systems to mount multiple shares, such features are not generally supported in a pre-boot environment. In addition, existing pre-boot limitations make distributed file system support difficult and result in a significant negative impact on during pre-boot sequences including, but not limited to, power on self-test (POST). Moreover, existing automatic failover and recovery tools generally lack the intelligence to identify and execute recovery solution firmware in the pre-boot environment.

SUMMARY

In accordance with teachings disclosed herein, common limitations associated with distributed file system support in preboot execution environments are addressed by disclosed network boot methods, in which a UEFI client initiates an SMB negotiation with a remote server for an augmented capability protocol that supports secure distributed namespace compounding via customized commands and trusted share-specific and transaction-specific data structures, referred to herein simply as secure blobs, communicated over a secure tunnel. The client platform may include a nonvolatile storage resource containing factory-installed AC modules for both the client and the server, as well as factory stored profile information for known remote shares. The storage resource's GUID may be used to generate GUID-specific blobs to secure the storage resource from access by unauthorized clients.

Upon successfully negotiating for the AC protocol, the UEFI client may retrieve the client and server modules that support the AC protocol and customized commands from the storage resource. The UEFI client may install the AC client module and push the AC server module to the remote server via the secure tunnel. The AC client module enables the UEFI server to function as a resource referred to herein as the AC UEFI client or, more simply, the AC client.

The AC client may mount a local namespace, which includes a namespace folder for each remote share. The AC server module, in combination with remote share profile information provided by the AC client, enables the remote server to mount a virtual distributed namespace and function as a remote virtual distributed namespace (RVDN) server.

The customized commands may incorporate a virtual namespace header and virtual server information into a data payload of a standard SMB read/write request. The virtual namespace header may include information indicative of the remote share and thereby permit the modified command to 5 identify a targeted remote share.

On the server side, the RVDN aggregates multiple virtual DFS mount points into a single mount point share. For at least some transactions, including transactions establishing SMB connections and secure sessions, disclosed methods may distribute a single request from the AC client across each of the remote shares identified the platform data store, thereby potentially reducing the number of request transactions sent from the platform client by a factor of 1/N where N is the number of remote shares. Disclosed systems beneficially enable a platform to connect to multiple remote shares in pre-boot environment without any changes to the client's network configuration. The system may also beneficially enable the runtime loading of symbols based on the file system's crash module to 20 facilitate remote remediation and to achieve a silent recovery mechanism that improves user experience.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a first set of exemplary SMB transactions for establishing sessions with a plurality of remote shares according to the prior art;

FIG. 4 illustrates a second set of exemplary SMB transactions for establishing sessions with a plurality of remote shares;

DETAILED DESCRIPTION

Exemplary embodiments and their advantages are best understood by reference to FIGS. 1-9, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1:
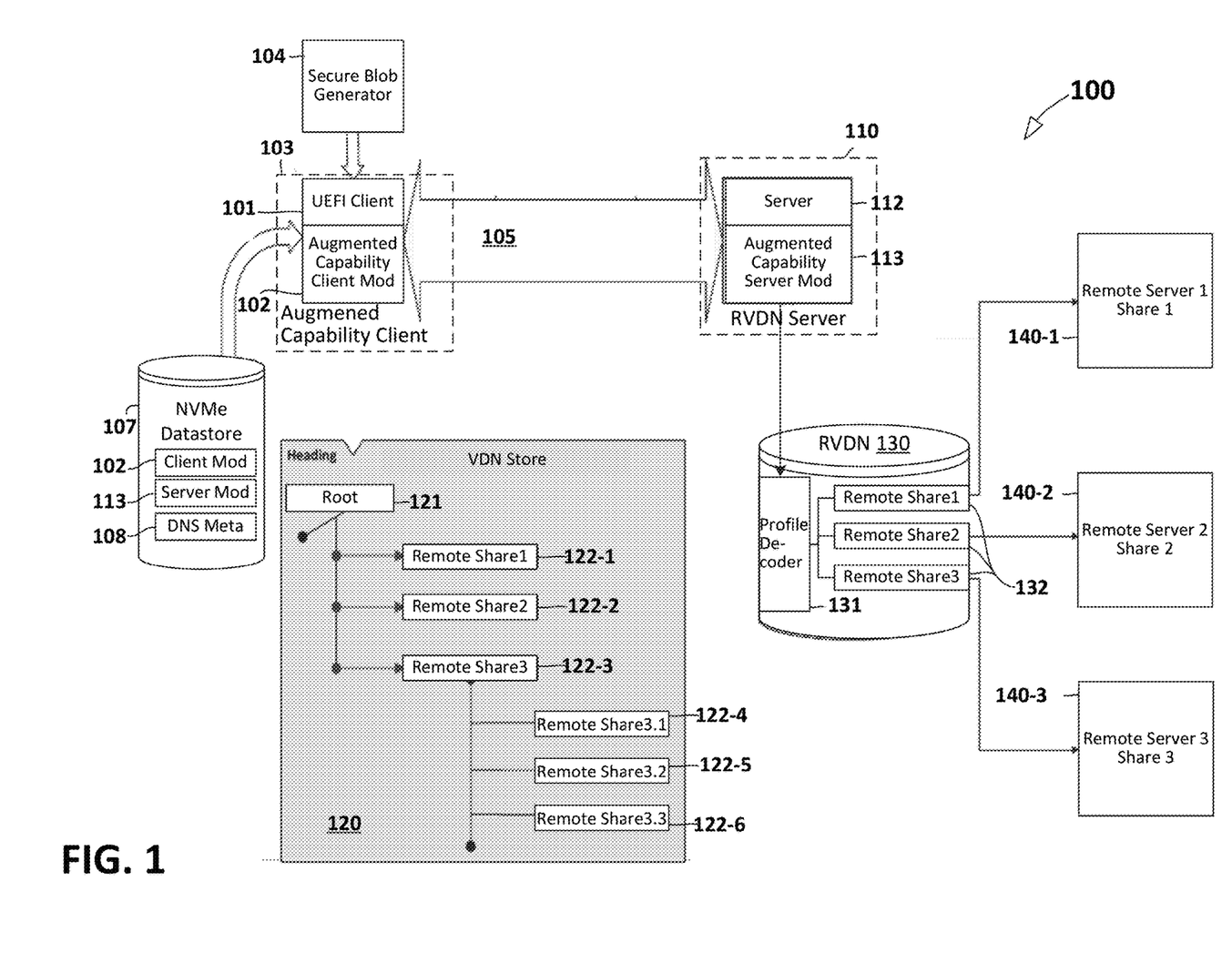
FIG. 1 illustrates a network boot architecture in accordance with disclosed subject matter.

Referring now to the drawings, FIG. 1 illustrates an exemplary information handling architecture 100 in accordance with a disclosed network boot method to provide virtual distributed namespace capability to a UEFI client resource operating in a preboot execution environment.

The architecture 100 illustrated in FIG. 1 includes a UEFI client 101 and a remote server 112 communicatively currently coupled by a secure tunnel 105. The secure tunnel 105 may include an SMB native security tunnel enhanced with customized security as illustrated and described in FIG. 2. The UEFI client 101 illustrated in FIG. 1 has installed an AC client module 102, retrieved from an NVMe datastore 107, to configure itself as an AC client 103 capable of generating and receiving customized SMB commands as described herein. Similarly, remote server 112 has installed AC server module 113 to configure itself as a RVDN server 110.

RVDN server 110 maybe configured to support various functions including, without limitation: (a) creating multiple directories, including one directory for each remote share. All data pertaining to a particular share is copied to and from this directory; (b)dividing incoming SMB commands based on the Profile ID and distributing distinct instances of the same SMB command to the appropriate directories; (c) aggregating all of the SMB commands from the Directories, attaching a profile header to the SMB command and sending the command across the SMB Session to the server.

The RVDN Server 110: (a) handles all incoming SMB commands and decodes Virtual Namespace headers embedded within customized SMB commands; Forwards decoded SMB commands to the server/share indicated in the Profile ID; aggregates the SMB from respective remote share and includes the profile header into the SMB command before sending the reply command across to AC client 103.

Thus, embodiments of RVDN server 110 are configured with functionality for effectively converting customized SMB commands from AC client 103 into one or more standard SMB commands targeting one or more of the remote shares 140 and communicating those SMB commands to the remote shares via share-specific transports 134.

A secure blob algorithm is employed to communicate with NVMe Data Store 107. At the factory, all known remote share profiles are stored securely in NVMe data store 107. UEFI client 101 opens a communication channel to the store that is mapped with a pre-boot remote server.

The illustrated architecture 100 includes a resource referred to as a secure blob generator 104 which is configured to generate share-specific and/or transaction specific secure data structures, referred to as blobs. The secure blobs may encapsulate customized SMB commands and data read/written by AC client 121.

The datastore 107 illustrated in FIG. 1, in addition to storing the AC client module 102, stores an AC server module 113 and distributed name space meta-data 108, which may include information indicating profiles for each of the remote shares. The data structures stored in datastore 107 as well as the datastore itself may be factory installed data structures, which has a GUID known to the platform manufacturer.

FIG. 1 further illustrates a local VDN 120 including a single mount point root directory 121 and namespace folders 122 for each of the remote shares 140. The AC client 103 shown in FIG. 1 may mount the root 121 and coordinate the local VDN 120 such data received from a remote store 140 is stored in the corresponding namespace folder 122 in local VDN 120.

The AC client 103 may push metadata 108 to the remote server 112, along with the AC server module 113. Remote server 112 may configure itself as an RVDN server 110 and configure an RVDN namespace 130 on the server side. The RVDN 130 illustrated in FIG. 1 includes a profile decoder 131 and target folders 132 corresponding to each of the remote shares 140.

Figure 9:
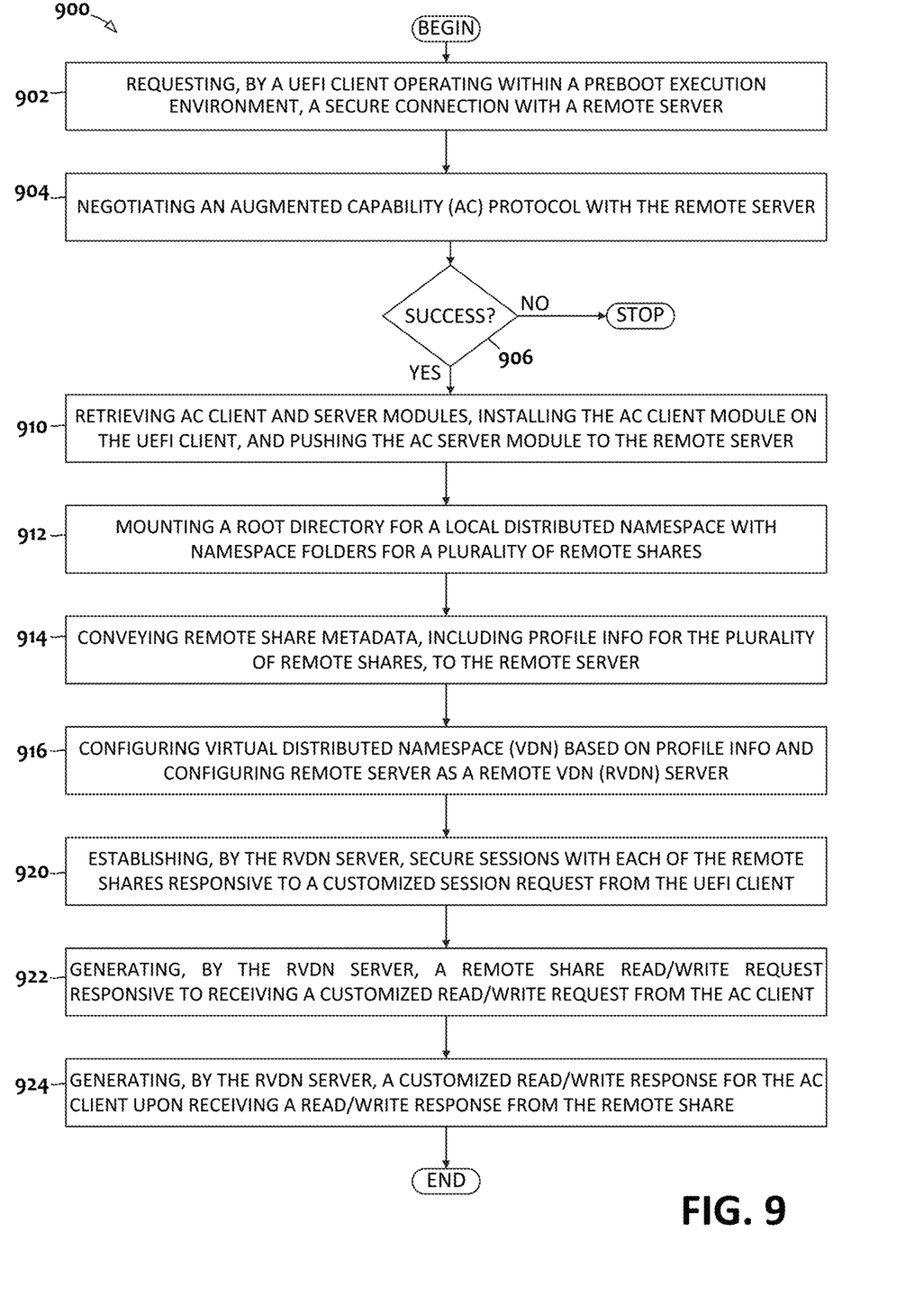
FIG. 9 illustrates a block diagram of a UEFI network boot method in accordance with disclosed subject matter.

In an embodiment described in more detail in FIG. 9, a UEFI client 101 establishes an SMB session with remote server 112 and negotiates for an augmented capability protocol that supports modified SMB commands and leverages compounded requests natively supported by SMB.

In the architecture 100 illustrated in FIG. 1, the client resource, referred to herein as an augmented capability UEFI client 101, is communicatively coupled to a remote server resource, referred to herein as remote server 112, by a secure tunnel 105.

Upon successfully negotiating for the distributed namespace capability, UEFI client 101 may retrieve AC client module 102 from NVMe datastore 107 and install the AC client module 102 as a driver module for UEFI client 101. UEFI client 101 may also retrieve AC server module 113 from NVMe datastore 107 and push the module 113 to remote server AC server module 113 from NVMe datastore 107. UEFI client 101 may then and push AC server module 113 to remote server 112 over secure tunnel 105.

Figure 2:
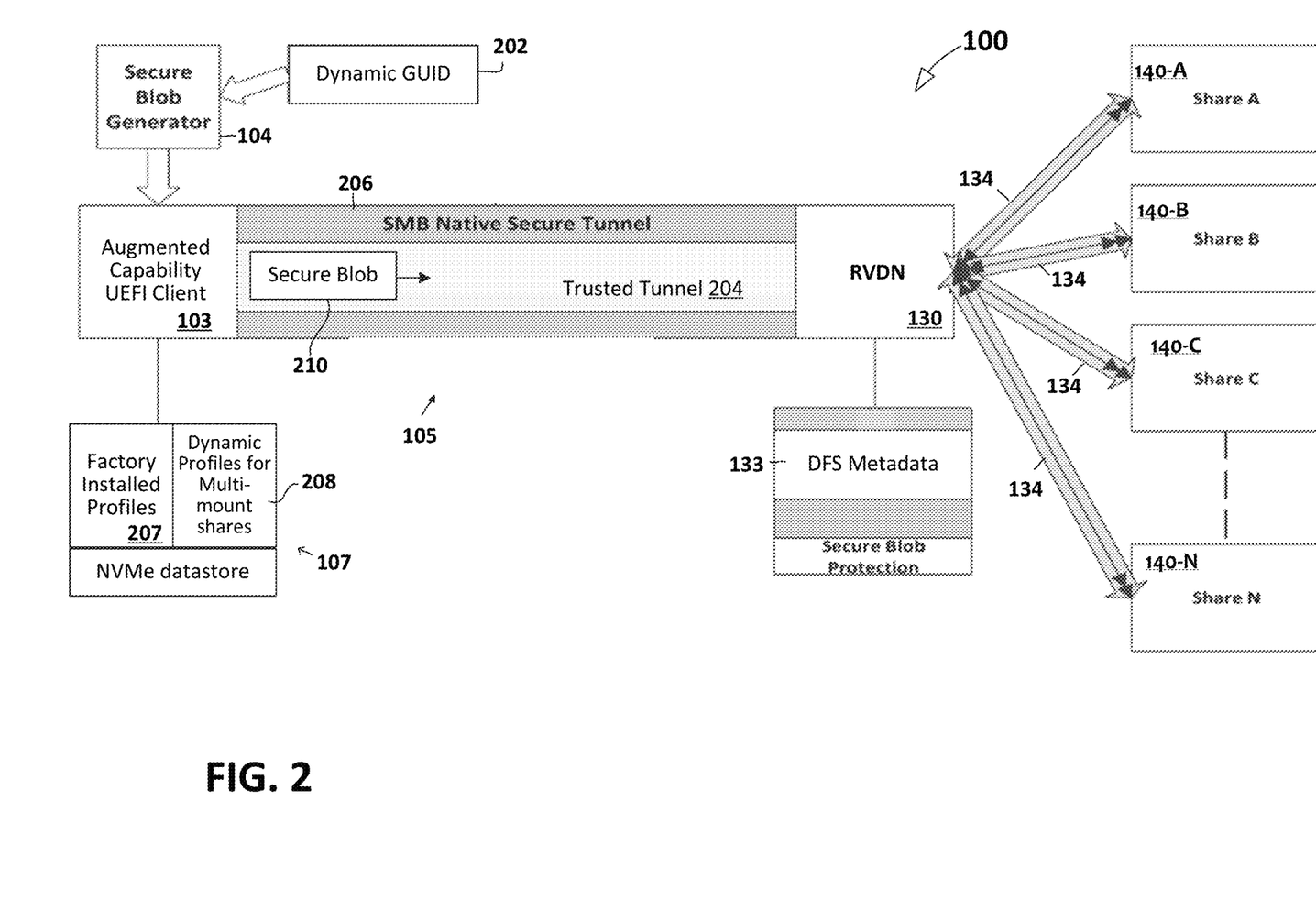
FIG. 2 illustrates aspects of a UEFI client coupled to a virtual distributed namespace.

Referring now to FIG. 2, additional detail of aspects of the architecture 100 illustrated in FIG. 1 are depicted. FIG. 2 illustrates a dynamic GUID generator 200 configured to provide GUIDs to secure blob generator 104. The illustrated configuration may support transaction-specific secure blobs backed by GUIDs generated for each customized SMB transaction handled by AC client 103. The transaction-specific security supplements profile-specific security embedded in the profile metadata that functions as a trusted tunnel 204, illustrated in FIG. 2, for client-server communications. The trusted tunnel 204 illustrated in FIG. 2 is drawn within a secure tunnel 206 which is native to SMB implementations and includes include authentication and document signing among other features.

FIG. 2 illustrated NVMe datastore 107 including factory installed profiles 207 to which DFS multi-mount paths 208 may be dynamically added from the BIOS setup.

AC client 103 is responsible for all SMB communications with the server. AC server 113, which is also stored in NVMe data store 107, is pushed to the server during unified distributed namespace (UDN) negotiation.

FIG. 2 illustrates additional detail of the architecture illustrated in FIG. 1. A proprietary secure blob with trusted tunnel 204 (FIG. 2) is negotiated during initial negotiations between UEFI client 101 and remote server 112. Upon verifying the secure blob, secure channel 201 is established between AC client module 102 and RVDN 110. An SMB Native Secure Tunnel 204 represents trusted and accepted security provided by Microsoft, as an example. This security may include secure authentication, encryption resources and message signing resources.

Message signing services may be supported by a dynamic GUID generator 202, which may generate a GUID for every SMB transaction used to generate a secure blob. The dynamic GUID may be used by the augmented protocol to generate a Secure Blob Server that provides a share. This blob may be used for communication between AC client 103 and RVDN server 110. In addition, an NVMe data store ID may be used for communication between AC client module 102 and NVMe data store 107.

Secure blob protection features help to ensure the existence of only one Unique Key for maintaining Secure Session between UEFI client and a Remote share. A vendor Secure Blob Decoder Algorithm may decode the Secure Blob, extract the GUID, and identify the Remote share from the share's Profile.

The RVDN may establish secure communication Channels with Remote shares. For regular SMB commands, RVDN may act as an SMB header modifier by replacing share information of the share in the forward direction and with UEFI client information in the backward direction. In this way a double secure channel is established between the local namespace 120 to AC client 103 to RVDN 130 to physical remote shares 140.

Turning now to FIG. 9, a network boot method 900 that provides distributed file system support to a UEFI client operating in a preboot execution environment is illustrated in block diagram format. The method 900 illustrated in FIG. 9 begins with the UEFI client requesting (step 902) a secure SMB connection/session with a remote server. The UEFI client may then negotiate (step 904) for an augmented capability protocol or SMB+ protocol that includes distributed namespace support and recognizes SMB commands.

If the negotiation concludes (step 906) unsuccessfully, method 900 terminates. Otherwise, the UEFA client may then retrieve (step 910) AC client and server modules that support the customized commands and other features of the augmented protocol. The UEFI client may install the AC client module as a UEFI client driver and pushes the AC server module to the remote server.

The client may then mount (step 912), a root directory for a local distributed name space that includes name space folders for each of the remote shares (400, FIG. 2). The illustrated method may then convey (step 914) remote share metadata, including profile information for the plurality of remote shares, to the remote server. With the remote share metadata and the AC server module, the remote server may configure (step 916) an RVDN and configure itself as an RVDN server.

The RVDN server may then respond to receiving a customized SMB command from the AC client requesting a secure session by establishing (step 920) multiple secure sessions including a secure session for each of the remote shares. After secure sessions have been established between the RVDN server and each of the remote shares, the RVDN server may respond to receiving a customized read write command, an example of which is illustrated and described in FIG. 7, from the AC client by generating (step 922) one or more standard SMB read/write requests to one or more of the remote shares. Generally speaking, read/write operations would target or identify a single remote share for read write access. However, in at least some situations, the RVDN server may be configured to generate multiple read write requests to multiple remote shares. If as an example, a data structure was striped across a plurality of remote shares, the AC client could retrieve two or more stripes of the data structure with a single customized read request.

Figure 8:
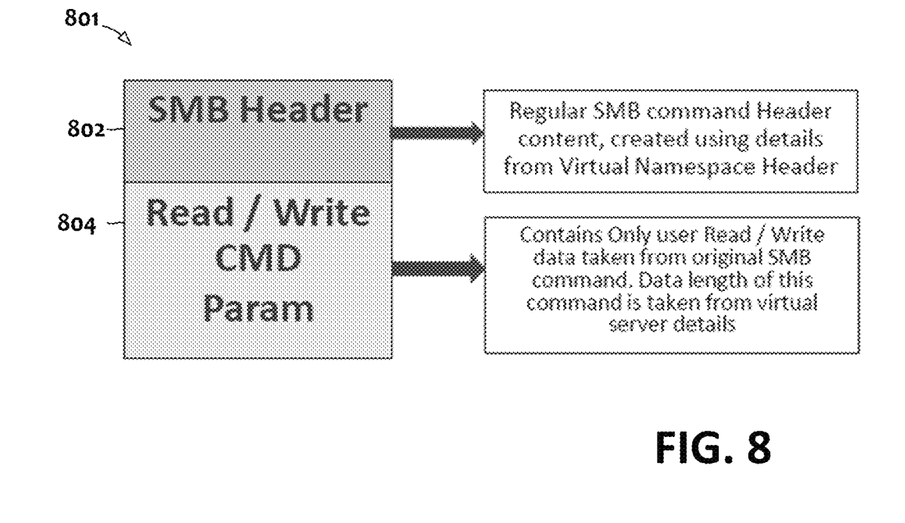
FIG. 8 illustrates aspects of second customized command used in the architecture of FIG. 1.

When one or more of the remote shares sends a reply to the RVDN server, the RVDN server may generate (step 924) a customized read/write response, an example of which is illustrated and described in FIG. 8, for the AC client. Referring now to FIG. 3 and FIG. 4, performance advantages achieved using the architecture illustrated in FIG. 1 and FIG. 2 are illustrated. FIG. 3 and FIG. 4 illustrate performance advantages of the disclosed architecture in the context of establishing secure sessions with multiple remote shares while FIG. 5 and FIG. 6 demonstrate performance advantages applicable to SMB I/O transactions.

FIG. 3 illustrates two sets of SMB negotiate transactions 301-1 and 301-2 and two sets of session set up transactions 302-1 and 302-2 necessary to establish sessions with two remote server shares. In addition, although not fully depicted in FIG. 3, two distinct sets of tree connect transactions 303 (only one of which is illustrated in FIG. 3) would be needed to access a particular share on each remote server. Those of ordinary skill will appreciate that, as the number of remote shares increases from two to N, the number of required transactions increases linearly because each remote share requires at least 3 transactions (e.g., a negotiate transaction, a session transaction, and a tree-connect) to establish a secure session wherein each transaction in SMB or another suitable REST-based protocol requires two commands (request and reply). Thus, the UEFI client would have to issue 3N requests and handle the corresponding 3N responses to establish secure connections with N remote server shares. FIG. 3 should not be interpreted to imply that conventional UEFI clients operating in a preboot execution environment could access two or more remote server shares. Instead, FIG. 3 is illustrative of the number of theoretical transactions required.

Figure 7:
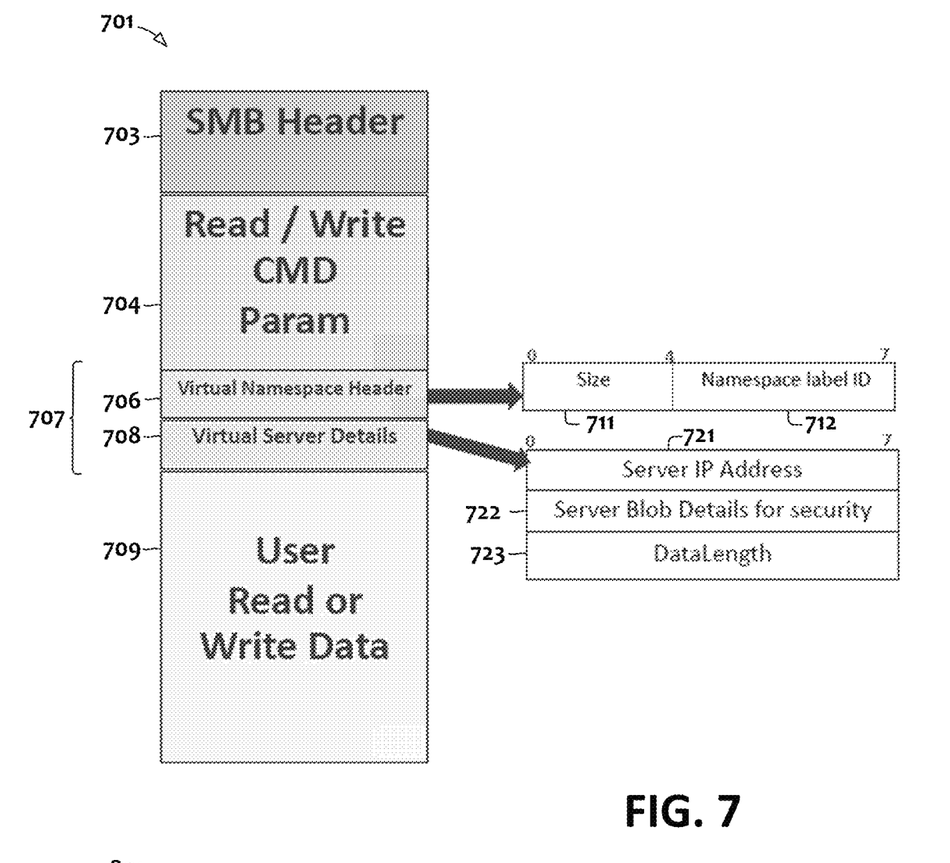
FIG. 7 illustrates aspects of a first customized command used in the architecture of FIG. 1.

FIG. 4 illustrates that, when configured as described in FIG. 1 and FIG. 2, secure connections can be established to N remote shares with just three modified-SMB requests, illustrated and described in more detail in FIG. 7, where N can vary within the range permitted by the protocol. A single set of transactions 401, 402, and 403 is sufficient to establish sessions with all remote shares because when RVDN 130 is configured to generate compounded SMB transactions including an SMB transaction for each remote share represented in the distributed namespace.

Figure 5:
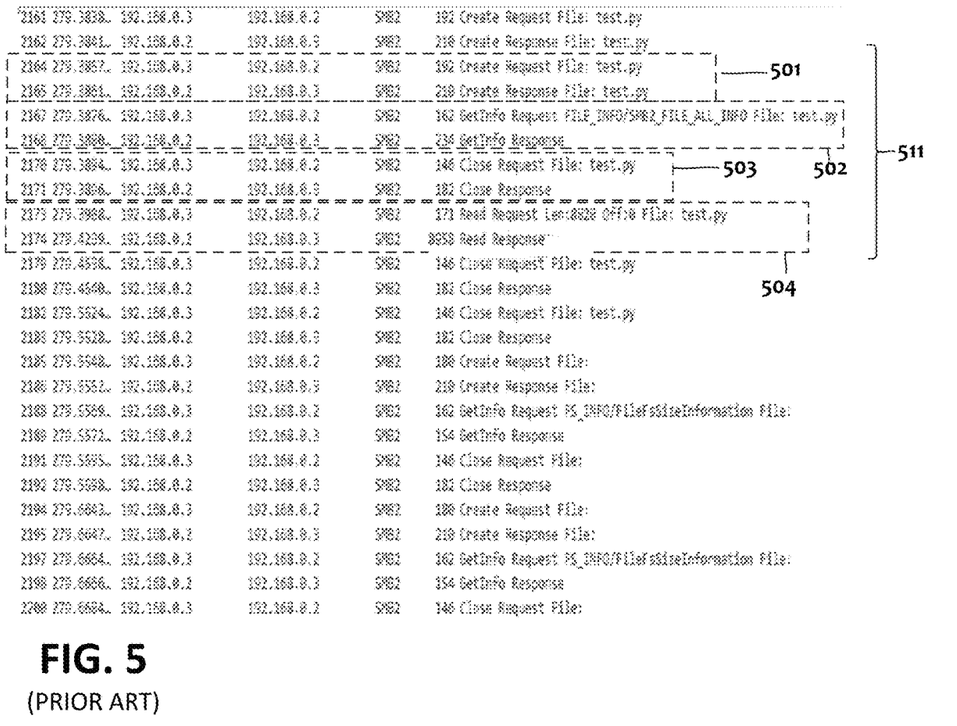
FIG. 5 illustrates a first set of exemplary SMB I/O transactions according to the prior art.
Figure 6:
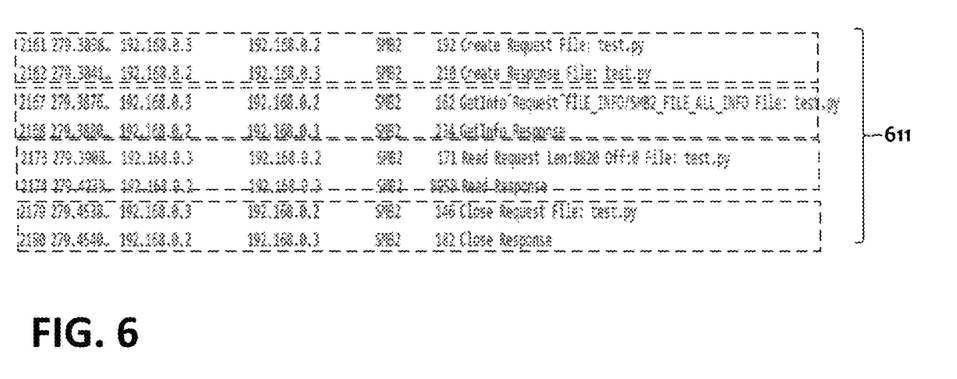
FIG. 6 illustrates a first set of exemplary SMB I/O transactions.

FIG. 5 and FIG. 6 illustrate improved performance achieved during read operations analogous to the improvement illustrated in FIG. 4 vs. FIG. 3 by again reducing the number of SMB requests that AC client 103 is required to make. As seen in FIG. 5, multiple SMB commands 501 through 504, collectively identified herein as transaction group 510, are required for a read request to a single remote share. If the UEFI client were required to read data from N remote shares, each share would necessitate a corresponding transaction group 510. FIG. 6 illustrates a minimum set of SMB commands 611 for a read transaction. Any SMB command request sent to the Server share, for e.g.: Read Request, will be sent to RVDN server 110. All other necessary commands request with Server Share including, as examples, multiple opens, get/query info, multiple close request, keep alive message, and many Error handling transactions if any, are all handled by the RVDN server 110. In some embodiments, SMB caching may be used in AC client 103 and RVDN server 110 to facilitate synchronization of DFS metadata.

Referring now to FIG. 7 and FIG. 8, exemplary customized SMB commands 701 and 801 suitable for use in at least some embodiments of the architecture 100 illustrated in FIG. 1 and FIG. 2 are illustrated. The customized command 701 in FIG. 7 includes an SMB header 703, a read/write command parameters section 704, a customized header 707, and a user read/write data payload 709. The customized header 707 illustrated in FIG. 7 includes a virtual name space header 706 and a virtual server detail section 708.

In at least some embodiments, customized SMB command 701 is representative of a customized request from AC client 103 to RVDN server 110 while customized SMB command 801 of FIG. 8 is representative of a command from RVDN server 110 to AC client 103. The SMB header 703 corresponds to the regular SMB command header contact. And the read write command parameters 704 are the regular read write command details.

The customized header 707 differentiates customized SMB command 701 from standard SMB. The virtual name space header 706 includes a 4-bit size field 711 and a 4-bit Namespace label ID field 712. The Virtual Server Details 708 illustrated in FIG. 7 includes a Server IP address field 721, Server Blob details 722, and a data length field 723.

The SMB command 801 illustrated in FIG. 8 includes an SMB had her 802 and a read right command parameter section 800 for. The SMB header 800 to include regular SMB command header continent but he's created using details from virtual name space heater 706 in FIG. 7. The read ride command perimeter section 800 for contains only use a rewrite data taken from the original SMB command. The data length of this come out is taken from The virtual server details 708th in FIG. 7.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A network boot method, comprising:
   sending, by a unified extensible firmware image (UEFI) client executing on a client platform, a client request for a secure message block (SMB) connection with a remote server;
   negotiating an augmented capability (AC) protocol with the remote server;
   mounting a root directory for a virtual distributed namespace (VDN), wherein the VDN encompasses a plurality of remote shares; and
   conveying profile metadata, indicative of a profile for each of the plurality of remote shares, to the remote server to establish the remote server as a remote VDN (RVND) server;
   wherein the RVDN server is configured to:
      establish an SMB session with each of the remote shares responsive to receiving the client request; and
      responsive to receiving a data request from the UEFI client, generate a compound SMB request comprising a plurality of remote share data requests including a remote share data request corresponding to each of the plurality of remote shares.

2. The method of claim 1, wherein communication from the UEFI client to the RVDN server includes secure blobs generated by an AC client module based, at least in part, on a profile of the RVDN conveyed within a native SMB secure tunnel.

3. The method of claim 2, wherein the compound SMB request includes AC information, wherein the AC information includes a VDN header, indicative of the virtual domain namespace and RVDN server information.

4. The method of claim 2, wherein the secure blobs are generated based, at least in part, on a globally unique identifier (GUID) specific to the client request.

5. The method of claim 1, wherein mounting includes retrieving the profile metadata from a local nonvolatile data store.

6. The method of claim 5, wherein retrieving the profile metadata comprises retrieving a secure blob indicative of the profile metadata, wherein the secure blob is generated based, at least in part, on a globally unique identifier of the data store.

7. The method of claim 1, wherein negotiating the AC protocol includes:
   retrieving an AC client module from a local data store and installing the AC client module on the UEFI client; and
   retrieving an AC server module from the local data store and pushing the AC client module to the remote server.

8. An information handling system, comprising:
   a central processing unit (CPU);
   a system memory communicatively coupled to the CPU; and
   a network interface resource configured to perform network boot operations including:
   sending, by a unified extensible firmware image (UEFI) client executing on a client platform, a client request for a secure message block (SMB) connection with a remote server;
      negotiating an augmented capability (AC) protocol with the remote server;
      mounting a root directory for a virtual distributed namespace (VDN), wherein the VDN encompasses a plurality of remote shares; and
      conveying profile metadata, indicative of a profile for each of the plurality of remote shares, to the remote server to establish the remote server as a remote VDN (RVND) server;
      wherein the RVDN server is configured to:
         establish an SMB session with each of the remote shares responsive to receiving the client request; and
         responsive to receiving a data request from the UEFI client, generate a compound SMB request comprising a plurality of remote share data requests including a remote share data request corresponding to each of the plurality of remote shares.

9. The information handling system of claim 8, wherein communication from the UEFI client to the RVDN server includes secure blobs generated by an AC client module based, at least in part, on a profile of the RVDN.

10. The information handling system of claim 9, the compound SMB request includes AC information, wherein the AC information includes a VDN header, indicative of the virtual domain namespace and RVDN server information.

11. The information handling system of claim 9, wherein the secure blobs are generated based, at least in part, on a globally unique identifier (GUID) specific to the data request.

12. The information handling system of claim 8, wherein mounting includes retrieving the profile metadata from a local nonvolatile data store.

13. The information handling system of claim 12, wherein retrieving the profile metadata comprises retrieving a secure blob indicative of the profile metadata, wherein the secure blob is generated based, at least in part, on a globally unique identifier of the data store.

14. The information handling system of claim 8, wherein negotiating the AC protocol includes:
   retrieving an AC client module from a local data store and installing the AC client module on the UEFI client; and
   retrieving an AC server module from the local data store and pushing the AC client module to the remote server.

* * * * *